United States Patent [19]

Lenhardt

[11] Patent Number: 4,696,256

[45] Date of Patent: Sep. 29, 1987

[54] APPARATUS FOR THE PRODUCTION OF MULTIPLE LAYER GLASS SHEETS WITH PLASTIC SEALS

[75] Inventor: Karl Lenhardt, Neuhausen-Hamberg, Fed. Rep. of Germany

[73] Assignee: Saint-Gobain Vitrage, Courbevoie, France

[21] Appl. No.: 768,220

[22] Filed: Aug. 22, 1985

[30] Foreign Application Priority Data

| Aug. 22, 1984 [FR] | France | 84 13088 |
| Sep. 17, 1984 [FR] | France | 84 14185 |
| Sep. 17, 1984 [FR] | France | 84 14186 |

[51] Int. Cl.[4] .............................................. B05C 5/02
[52] U.S. Cl. ...................................... 118/680; 118/50; 118/697; 118/410
[58] Field of Search ................. 118/410, 323, 324, 50, 118/696, 697, 680, 681; 198/689.1

[56] References Cited

U.S. PATENT DOCUMENTS

| 3,202,302 | 8/1965 | Insolio | 198/689.1 X |
| 3,545,631 | 8/1970 | Mojden et al. | 271/12 |
| 4,519,962 | 5/1985 | Schlienkamp | 118/323 X |

Primary Examiner—John P. McIntosh
Attorney, Agent, or Firm—Oblon, Fisher, Spivak, McClelland & Maier

[57] ABSTRACT

The invention relates to laying of a bead of plastic, of the type with a butyl rubber base, on the periphery of a glass sheet intended to go into the composition of a multiple layer glass sheet. The bead is deposited with an extrusion unit having a nozzle. The glass sheet and nozzle are both able to be driven in movements amounting to translations, these translations of the glass sheet and the nozzle being performed in different directions.

20 Claims, 4 Drawing Figures

APPARATUS FOR THE PRODUCTION OF MULTIPLE LAYER GLASS SHEETS WITH PLASTIC SEALS

BACKGROUND OF THE INVENTION

1. Field of the Invention

This invention relates to the production of multiple layer glass sheets with plastic seals. It relates more particularly to laying a bead of plastic of the type with a butyl rubber base on the periphery of a face of a glass sheet, this bead being intended to act as a seal and interlayer between this first sheet on which it is deposited and a second glass sheet applied later, the second sheet being applied against the other side of the bead and parallel to the first glass sheet.

2. Discussion of the Related Art

Within the context of production of multiple layer glass sheets various techniques for injection of plastic of the polysulfide type on the periphery of double layer glass are known. However, plastics of the polysulfide type have a behavior quite different from materials with a butyl rubber-base, in particular their viscosity is much lower and the laying conditions and the stresses to be met are totally different. Consequently, these known techniques cannot be used for laying a bead of a material with a butyl rubber base on the periphery of one face of a single glass sheet.

This bead must have well defined physical characteristics to stick to the glass sheet, on the one hand, and to perform its role of interlayer, on the other hand. In particular it should have a rather precise consistency or viscosity as defined in the French Pat. No. 2 294 313 to be greater than 115° Mooney at the end of eight minutes and at 40° C. It must be continuous to form a fluid-tight seal. It should also be perfectly sized since its height determines the space between the two consecutive sheets and this height must be constant at all points of its length.

Further, it should be deposited on the glass sheet so as to form with it at the moment of its sticking an angle between 15° and 45° and preferably between 25° and 35°.

All these requirements are successfully met by forming the bead with an extruder whose nozzle forms the required angle of 15° to 45° with the glass sheet, this extruder being stationary and the glass sheet moving under it to present each of its sides successively to it. Such a laying process and installation necessary for putting it into practice are described in said French Pat. No. 2 294 313.

The glass sheet is translated horizontally under the nozzle of the extruder by a conveyor and is turned to successively present each of its sides under the nozzle by a rotation arm with an axis perpendicular to the plane of the conveyor fitted between the elements of said conveyor as described in the French Pat. No. 2 211 413.

Thus, glass sheets having a perimeter on the order of 5 m can be handled without problems.

Thanks to this prior installation, the glass sheet always passes in the same direction, under a single nozzle, so that the angle of 15° to 45° which the nozzle should make with the plane of the glass sheet to have a good sticking of the bead, can be obtained by locking of the nozzle in the desired position and there is no risk of the angle being altered when going from laying the bead along one side of the glass sheet to laying it along the other side. In this same way, considering that there is only one nozzle, a great consistency can be obtained in the dimensions of the bead provided.

Further, since the extruder is stationary, there are no weight limitations in the means for producing the bead. The elements of the extruder are defined by the operation of the extruder, and the elements of the extruder such as a motor, a brake clutch, etc., may be large and heavy.

Moreover, since the glass sheets move flat on a conveyor, for example with simple rollers or rollers provided with annular rings, they can have very precise movements, such as accelerations and brakings. This precision is due to the fact that the glass sheets rest by their entire surface on the rollers or rings and therefore their inertia is overcome by this great contact surface.

However, although depositing of the bead from a stationary nozzle onto a glass sheet laid flat and successively exhibiting all its sides to the nozzle has advantages, it also has disadvantages. Handling, and in particular rotation, on the conveyor of glass sheets of large dimensions, for example, with a perimeter on the order of 15 m is clumsy and is practically impossible. On the other hand, in a multiple layer glass production line certain operations are necessarily performed on glass sheets placed vertically, for example, pressing, optical checking, etc. The result is that when the peripheral bead is deposited on flat glass sheets, handling operations are necessary to go from the flat position to the upright position to perform pressing, optical checking, etc.

SUMMARY OF THE INVENTION

This invention has as its object avoiding the drawbacks of the prior art, namely the difficulty of turning large-sized glass sheets to present all their sides successively under an extrusion nozzle, and the need to handle the glass sheets to move them from a flat position to an upright position to perform certain operations in the upright position.

For this purpose, the invention proposes depositing a bead on a glass sheet with an extrusion unit having a nozzle, the glass sheet and the nozzle being able to be driven in translation movements. These translations of the glass sheet and of the nozzle are performed in different directions.

In an embodiment advantageous for its simplicity in practice during production of rectangular sheets, these directions of movement of the glass sheet, on the one hand, and of the nozzle, on the other hand, are orthogonal.

Advantageously, the glass sheets are placed vertically or approximately vertically.

Advantageously, to guarantee a constancy of the size of the deposited bead, the movements of the glass sheet, the nozzle supplying the bead, and the delivery of the material coming through the nozzle, are controlled simultaneously.

The invention also proposes an installation to practice the process described above.

This installation has a vertical or approximately vertical panel, a conveyor associated with the panel, able to make a glass sheet that is leaning on the panel pass in both directions, and an extrusion unit having at least one extrusion nozzle placed opposite the vertical or approximately vertical panel. The nozzle is able to be moved in translation parallel to the plane of the panel, in a direction different from that defined by the conveyor associated with said panel. Advantageously, the two directions of movement of the glass sheet on the conveyor and of the nozzle are orthogonal.

According to a preferred embodiment, particularly for depositing beads of great height on the sheet, in horizontal or oblique and generally nonvertical directions, a holding means of the small wheel type is associated with the extrusion nozzle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
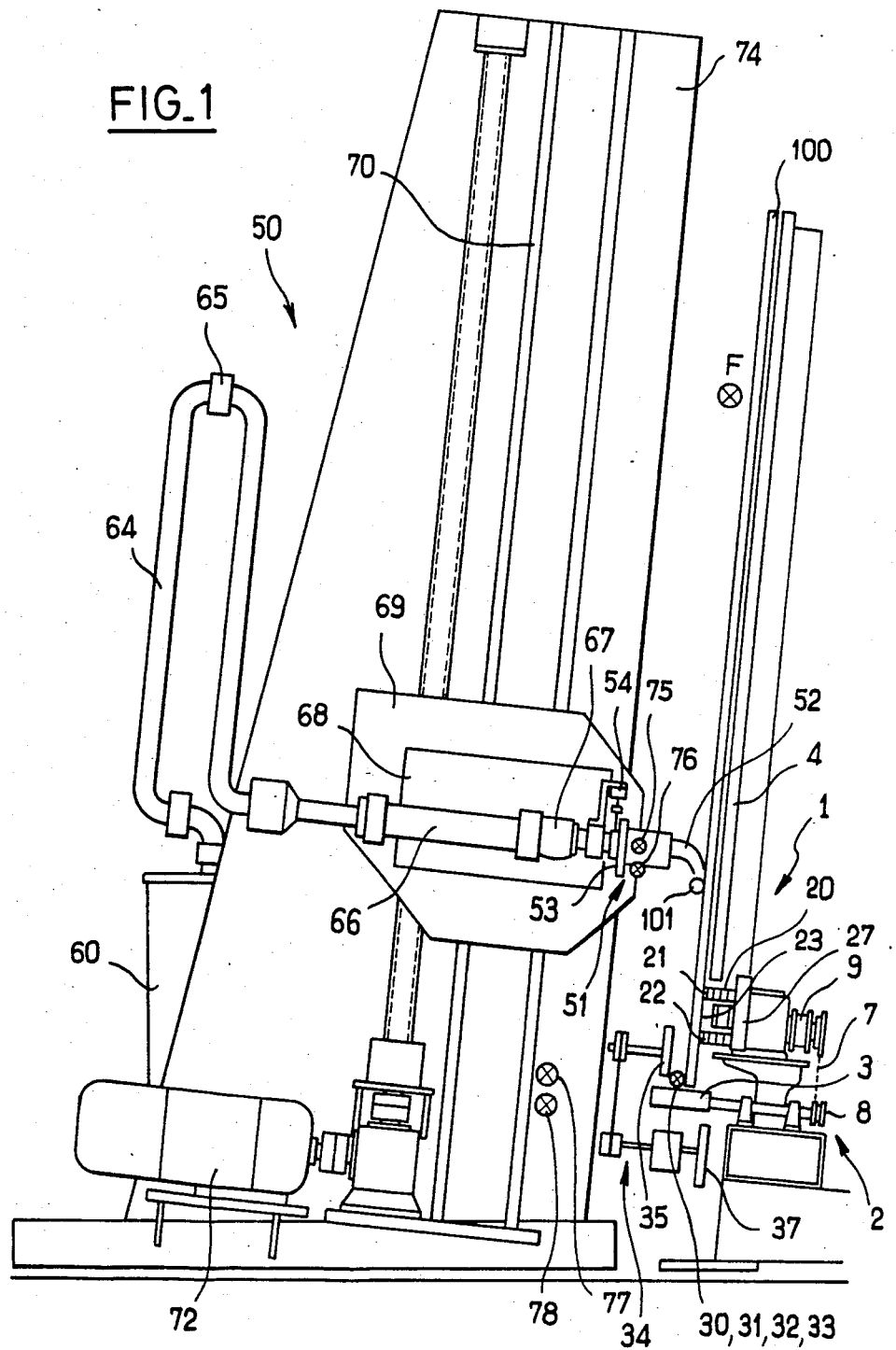
FIG. 1 is a schematic profile view of the installation for depositing a bead on a glass sheet according to the invention.
Figure 2:
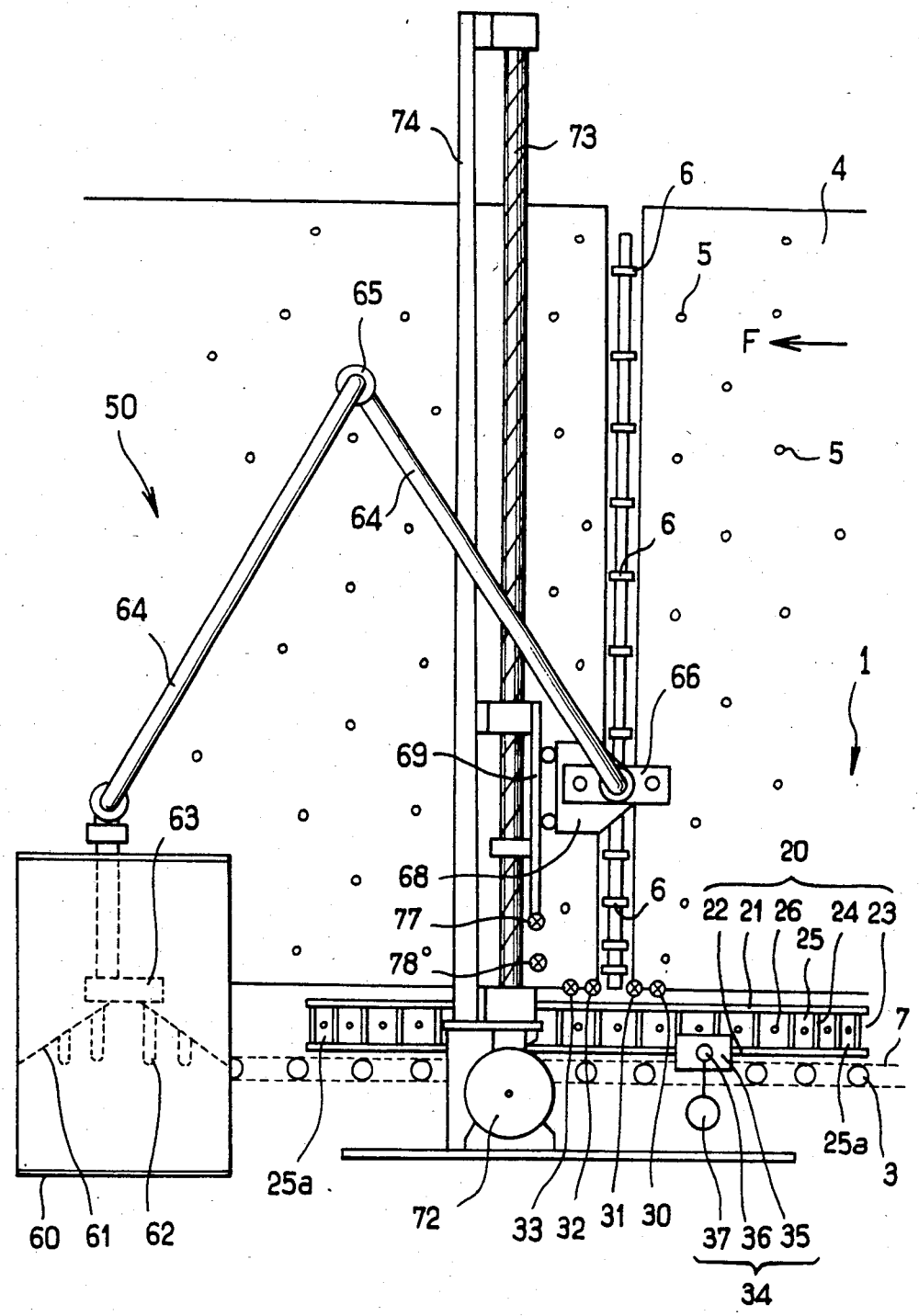
FIG. 2 is a schematic front view of the installation according to FIG. 1.
Figure 3:
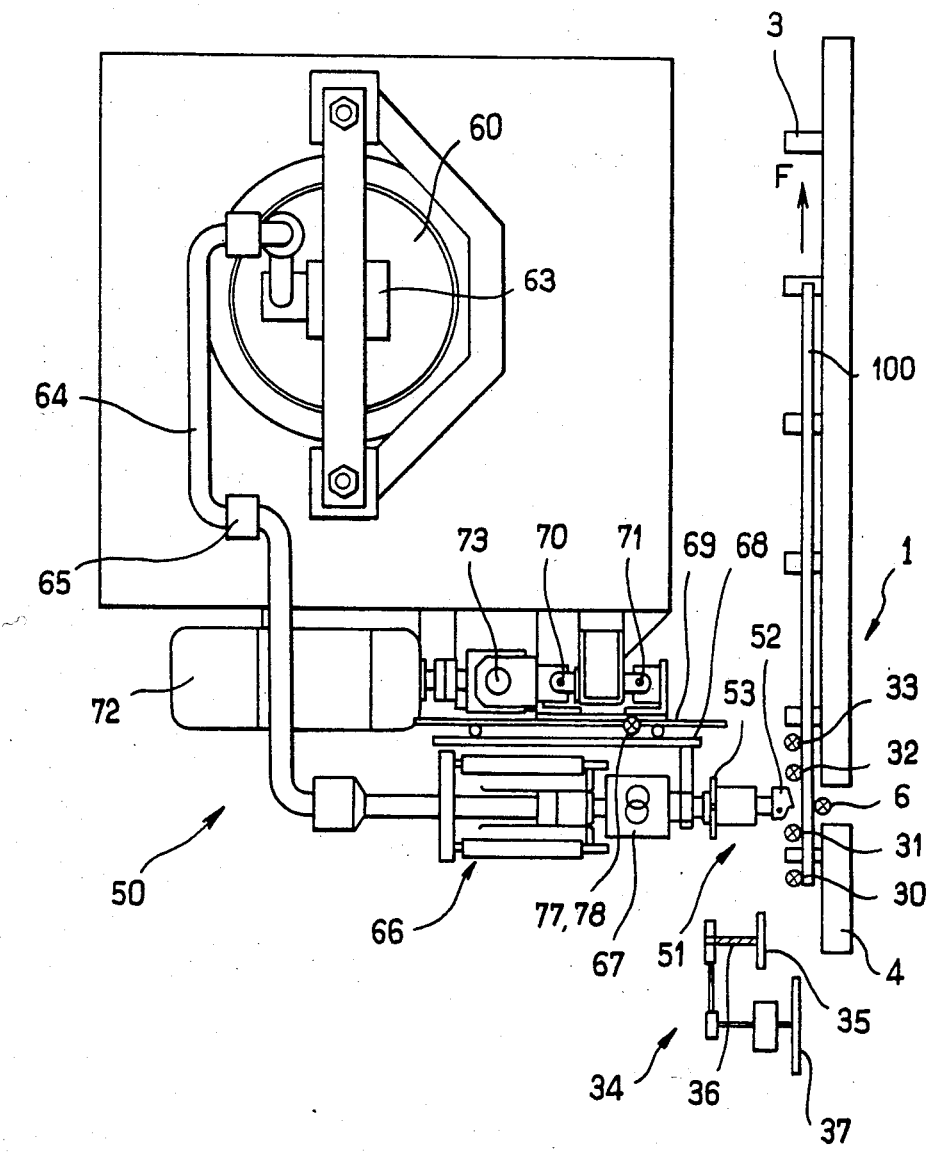
FIG. 3 is a top view of the installation according to FIGS. 1 or 2.

FIGS. 1, 2 and 3 show a unit 1 for conveying glass sheets 100 and a unit 50 for preparing plastic.

Unit 1 permits glass sheets 100 oriented in a vertical or approximately vertical position to pass opposite unit 50 which supplies plastic bead 101 so that bead 101 is deposited on the periphery of the face of glass sheet 100 directed toward the unit 50.

Conveyor unit 1 includes a conveyor 2 with rollers 3 with horizontal or approximately horizontal axes, placed at the base of a vertical or approximately vertical panel 4 against which glass sheets 100, passing on conveyor 2, lean. This panel 4 is provided with rollers, not shown, or preferably orifices 5 for blowing a gas such as air, to avoid friction of glass sheets 100 on panel 4, thanks to the gas cushion thus created between glass 100 and panel 4. To avoid discomfort of the operators in the absence of a glass sheet 100, those orifices 5 at a human head level are advantageously inclined upward or downward. Panel 4 is equipped, opposite extrusion unit 50, with at least one vertical row of rollers 6 projecting slightly from the plane of panel 4 and intended to serve as a support for portions of glass sheets 100 during extrusion. Advantageously, the rollers are retractable.

Conveyor 2 advantageously consists of a plurality of juxtaposed sections, each being suited for moving at a speed different from that of the other sections or, on the contrary, when desired, at the same speed. A standard system of chains 7 engaging sprockets 8 placed at the end of the shafts of rollers 3, as well as of clutches 9 and motors (not shown), makes it possible to obtain a movement of all the sections at the desired speeds. These motors are advantageously D.C. motors controlled, for example, by a programmed variable-speed drive. Only the elements of the drive system of conveyor 2 with rollers 3 can be seen in FIG. 1. Advantageously, rollers 3 are of a nonadhesive material of the Teflon type or are coated with such a material.

On a side thereof opposite unit 50, the low part of panel 4 is advantageously hollowed out, thus permitting the housing of a low-pressure conveyor system 20 guaranteeing the precision of the movements of glass sheets 100. This is provided because the high speeds of movement of said glass sheets and fast stops present a danger of sliding of the glass sheets on rollers 3, the glass sheets resting only on their edge on said rollers 3.

This conveyor system 20 includes two endless belts 21 and 22 of rubber type antislide material, placed parallel in the same plane and parallel to the plane of panel 4. The belts 21 and 22 are slightly in front of panel 4 by a distance that corresponds to the thickness of the air cushion between glass sheets 100 and said panel 4, typically about 1 mm. These endless belts 21 and 22 are driven in the same direction and at the same speed, which is also that of conveyor 2 placed immediately below, by a motor system not shown.

Endless belts 21 and 22 are placed above and below a low-pressure duct 23 having crosswise bars 24 which define a certain number of distinct vacuum chambers 25a, connected by a vacuum intake 26 to a box 27 under vacuum.

Belts 21 and 22 are placed slightly in front of the bottom of duct 23 and bars 24. For example bars 24 will be set back about 0.3 mm in relation to the surface of endless belts 21, 22, while the bottom of duct 23 will be set back about 2 mm in relation to the surface of the same endless belts. Vacuum chambers 25a placed at the ends or in the vicinity of the ends of this conveyor system 20 have smaller dimensions than chambers 25 of the middle part of conveyor system 20 to exert an excellent holding force on the glass sheets when they are taken up by the system or when they are discharged, even if only a small number of chambers 25 are covered by the glass sheets. To enhance the holding of glass sheets 100 when they reach or leave system 20, several vacuum orifices 26 can be provided in chambers 25 at the end or close to the ends of conveyor system 20.

Optionally, system 20 can have several separate sections, the belts of each section moving at the same speed and, advantageously, chambers 25a of the ends of each section being provided so that the vaccum therein is stronger there than in the middle chambers, i.e., they can have smaller dimensions, for example, they may have a width of only 5 to 10 cm instead of 20 to 25 cm in the middle area. They can also have several vacuum intakes 26. The space between two sections of the low-pressure system can allow housing of the vertical row of rollers 6. This conveyor system can be advanced or retracted in relation to the plane of panel 4 with connecting rods, not shown in the figures.

The structure of conveyor unit 1 also carries four detectors 30, 31, 32 and 33 for detecting the presence of glass sheets 100, the detectors being of the photoelectric cell type. Detectors 30 and 31 are placed upstream from the vertical row of rollers 6, while detectors 32 and 33 are placed downstream, respectively symmetrical with detectors 31 and 30 in relation to said row of rollers 6.

These detectors 30, 31, 32, 33 send signals which trigger variations of speed of conveyor 2 and of low-pressure conveyor system 20 and which act on the extrusion device.

The structure of conveyor unit 1 also carries a device 34 for measuring the thickness of glass sheets 100 upstream from the vertical row of rollers 6, for example by 5 cm, and also upstream from detector 30. This measuring device includes a plate 35 which may be brought in contact with the surface of glass sheets 100 by screw-jack 36 and a potentiometer 37 which is activated during advance of plate 35 to maintain such contact and measure thickness. This measuring makes it possible to position extrusion unit 50 in relation to the glass sheets as a function of their thickness. For example, the potentiometer may be rotary potentiometer driven by a rotary element of the screw-jack 36. Rotation of the rotary element drives the non-rotatable screw-jack shaft in a direction normal to the surface of panel 4. The rotary position of the potentiometer 37 upon contact of the glass and plate 35 is thus indicative of the glass thickness.

Advantageously, panel 4 is inclined at a slight angle of about 6° in relation to the vertical, assuring the balance of glass sheets 100.

Unit 50 for preparation of the plastic and extrusion of bead 101 of said plastic includes an extrusion head 51. This extrusion head has a nozzle 52 with an output inclined in relation to the plane of panel 4 at an angle of 15° to 45° and preferably 25° to 35° as described in said French Pat. No. 2 294 313. This nozzle 52 is equipped with a slide valve, not shown, of adjustable position, allowing modification of its section to extrude beads 101 of various heights, and a bead-cutter, also not shown, consisting of a blade operated by a jack, intended to cut bead 101 at the end of extrusion. This nozzle 52 is mounted to pivot on a collar 53 turning in an axis perpendicular to the plane of panel 4. A punch 54 makes it possible to lock said collar 53 in the desired position by engaging in notches, not shown, provided for this purpose on the periphery of collar 53.

FIGS. 1, 2 and 3 also show means supplying the plastic to extrusion head 51 and placed upstream from said head 51.

In the embodiment shown, these means consist of a tank 60 of crude plastic, i.e., as delivered and therefore having a high viscosity and hardness, too high to be able to be extruded, on the one hand, and to stick to the glass, on the other hand. This tank 60 is stationary. A heated conical piston 61 is provided with heating appendices 62 in the shape of plugs which plunge into the plastic, and is applied with pressure against the plastic contained in tank 60. A rotary internal gear pump 63 is placed at the output of this piston 61 and at its output supplies plastic under pressure. To this pump 63 are connected bent rigid pipes such as 64 connected by turning connectors such as 65 resistant to high temperatures and high pressures on the order of 300 to 400 bars.

These pipes are connected to a variable volume magazine 66 constituting a reserve of plastic and regulating the pressure of the plastic at its output. This magazine 66 is fed continuously and delivers plastic on demand at its output.

The output of this magazine 66 communicates with a positive displacement pump 67 driven by a D.C. electric motor, not shown, controlled by a programmed (for example by instruction cards) variable-speed drive. The output of this pump 67 is connected directly to extrusion head 51. The unit comprised of variable volume magazine 66, positive displacement pump 67 and extrusion head 51 is mounted on a carriage 68 carried by a plate 69 movable in a direction different from the direction of movement provided by conveyor 2, and advantageously in an direction orthogonal thereto. This plate 69 is able to move vertically along two slides 70, 71 parallel to panel 4 and therefore to the plane of glass sheets 100. Movement along these two slides 70, 71 is caused by a motor 72 which drives in rotation an endless screw 73 parallel to slides 70, 71, this endless screw 73 being engaged in ball sockets, not shown, fixed to plate 69. Slides 70, 71 and endless screw 73 are fastened along a vertical panel 74. Motor 72 is a programmed D.C. motor.

Carriage 68 is movable in relation to plate 69 in a direction orthogonal to the plane of panel 4 under the action, on the one hand, of an endless screw, not shown, operated by an electric motor, also not shown, and, on the other hand, by a jack, not shown. The electric motor is associated with a potentiometer, not shown, coupled to potentiometer 37. This electric motor makes it possible to adjust the glass-nozzle distance as a function of the thickness of glass sheets 100, while the jack makes it possible to move nozzle 52 closer to or farther away from the panel, by preset distances, particularly to put the nozzle in and out of operation.

Extrusion head 51 also carries two detectors 75 and 76 for indicating the presence of the glass, these two detectors following the movements of plate 69 along its slides 70, 71. These two detectors 75 and 76 are placed above extrusion head 51. One detector 75 detects the upper edge of the glass sheet when head 51 in its ascending movement is still only a few millimeters from this upper edge. The other detector 76 detects this upper edge when head 51 has reached its maximum level in its ascending movement.

Two microcontactors 77 and 78 are also provided on panel 74 along endless screw 73. One microcontactor 77 is intercepted when extrusion head 51 arrives at a set distance, on the order of some millimeters, from its extreme low position. The other microcontactor 78 is intercepted when the extrusion head reaches this extreme low position corresponding to the position of the bead deposited on the low portion of the glass sheet.

Immediately in front of the output of nozzle 52 is also placed a low-pressure system able to create a low pressure in the plastic supply circuit at certain instants. Such a system is described in French Pat. No. 2 207 799.

A device can be provided to support bead 101 when it is deposited along horizontal or oblique lines and has a tendency to sag. This device can be a set of wheels, particularly two wheels, not shown in the Figures. Advantageously these wheels are attached to extrusion head 51. They can be placed so that when head 51 is pivoted and deposits the bead along a nonvertical path, they come to position themselves under said bead which has just been extruded and which has just been glued to the glass sheet. Advantageously, the peripheral axial edges of the wheels have the shape of a hyperboloid of revolution. The unit supplying the plastic to extrusion head 51 is described only by way of example. Other units able to feed a linearly movably extrusion head 51 could be conceived. Particularly, it would be possible to have an endless screw extruder, said extruder being able to move in translation in a direction different from that defined by conveyor 2 and advantageously orthogonal to that direction defined by the conveyor.

A programmable logic control system, preferably including instruction cards, various detectors and contactors and comprising an entire electronic unit. able to process data and signals provided by these cards and detectors is also provided.

The program can provide that translations are made either by driving glass sheets 100 via conveyor 2, in a horizontal direction, or by driving extrusion head 51 in a direction orthogonal to that defined by conveyor 2, by rotation of endless screw 73, or by simultaneous driving of glass sheets 100 and of extrusion head 51.

In the first case, beads can be deposited along rectangular glass sheets, in the second case, depending on the relative speeds of the two translations, beads can be deposited on glass sheets of any shape.

The row of rollers 6 is placed exactly opposite nozzle 52.

The installation described above operates in the following way:

Initially, extrusion head 51 is in its extreme low position and nozzle 52 is oriented by rotation of its collar 53 to form the required acute angle with the part of panel 4 located above it.

A vertically extending glass sheet 100 intended to receive bead 101 on its periphery arrives on conveyor 2 while moving at high speed in the direction of arrow F shown in the figures, for example on the order of 50 m/min. On approaching extrusion unit 50, sheet 100 is taken on by low-pressure conveyor system 20 with belts 21 and 22 of antislide material moving at the same speed as conveyor 2. Thanks to the low pressure exerted in each of chambers 25 of this system, and thanks to the antislide properties of the material of belts 21 and 22, the movement of glass sheets 100 is very precise, so that said glass sheets rest on rollers 3 of the conveyor only by their edge. Before reaching the zone for laying of bead 101, glass sheet 100 is stopped upon detection by standard presence detectors, not mentioned earlier and not shown, and its thickness is measured. This occurs, for example, 5 cm before the row of rollers 6. Plate 35 is brought into contact with the surface of the glass by its jack 36, potentiometer 37 is then activated and it delivers a voltage that is put into a memory. This voltage then serves for guiding the correct positioning of extrusion head 51. The latter is moved in the direction of panel 4 by the electric motor which acts on carriage 68. When potentiometer 37 is activated it delivers a voltage and said electric motor acts as long as the delivered voltage is not equal to that put in memory and delivered by the measuring means.

Figure 4:
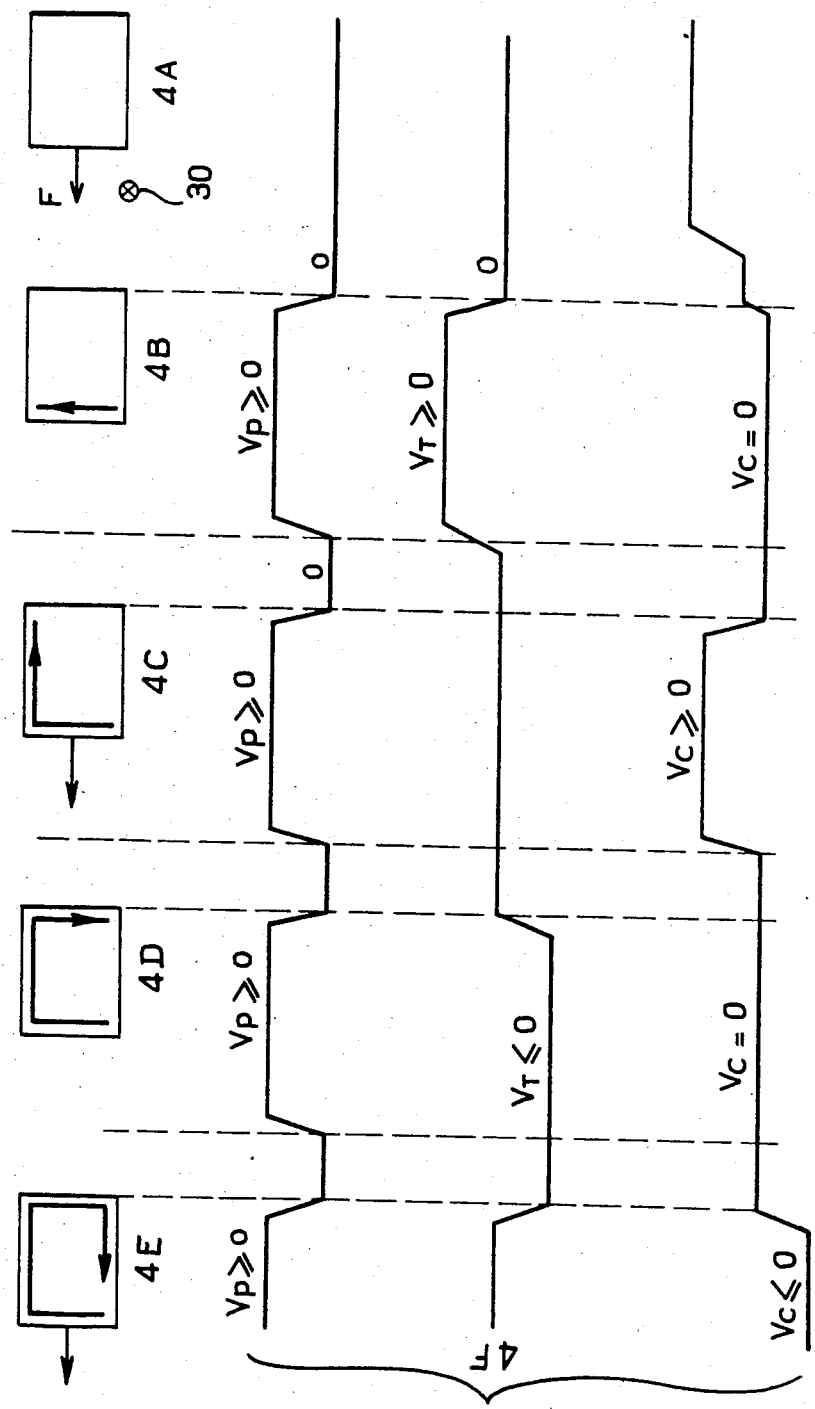
FIG. 4 is a block diagram illustrating the operation of the installation with associated speed diagrams.

The glass sheet, having resumed its passage, then encounters detector 30 as shown portion 4A of FIG. 4. This latter sends a signal which, after an adjustable delay, orders slowing of conveyor 2 and system 20 to a slow speed on the order of 3 m/nin. Glass sheet 100 then encounters detector 32 by its front edge. The detector then triggers immediate stopping of conveyor 2 and system 20. It also triggers, with a certain adjustable delay, the operation of positive displacement pump 67 at a preset speed, resulting in extrusion of bead 101. Upon an adjustable delay in relation to starting of the pump, the motor 72 is operated at a preset speed and in such a direction that plate 69, and therefore extrusion head 51, rises along slides 70 and 71. A bead is thus deposited along the vertical edge of glass sheet 100 as shown in portion 4B of FIG. 4. This is continued until detector 75 encounters the upper horizontal edge of glass sheet 100. Then, with an adjustable delay, it orders slowing of motor 72 and, in synchronism therewith, slowing of positive displacement pump 67, activating the low-pressure system, withdrawal of nozzle 52 relative to glass sheet 100 by the return movement of carriage 68 under the action of its jack and pivoting of the extrusion head. When detector 76 encounters the edge of the glass sheet, it orders the immediate stopping of motor 72 and pump 67.

Upon delay provided for pivoting the extrusion head, collar 53 is turned, thus placing nozzle 52 in a good position for the next extrusion on the other side of the glass sheet. The carriage is then brought close to the glass, as is nozzle 5, and finally the low-pressure system is activated, positive displacement pump 67 restarts and conveyor 2 is started thus making glass sheet 100 pass in the direction of arrow F (portion 4C) while laying a bead.

Laying of the bead is continued at constant speed on the horizontal upper side of the glass sheet until the back edge of the said glass encounters detector 30. The latter, upon an adjustable delay, triggers slowing of the passage of the glass, slowing of pump 67, return of nozzle 52 to its original position, release of low pressure and pivoting of the extrusion head.

The edge of the glass sheet then encounters detector 31, which orders stopping of conveyor 2 and pump 67.

Pivoting of the extrusion head is then performed and the device is then ready to deposit bead 101. Laying of bead 101 is performed on the side of the glass sheet, extrusion head 51 being driven in descending vertical translation, by movement of plate 69 along its slides (portion 4D).

Interception of microcontactor 77 triggers, with adjustable delays, the slowdown of the movement of translation, of the rotation of the pump, and also . triggers, with adjustable delays, pivoting of the extrusion head, putting the low-pressure system into operation and returning of the nozzle. At the interception of microcontactor 78, the translation movement stops and pump 67 ceases to turn. The provided delay times having passed, the extrusion head pivots. Then, as already described in relation to laying of the bead on the upper horizontal side, the various operations for restarting the laying of the bead are triggered, and a bead is deposited along the lower horizontal side of the glass sheet, the latter moving in the direction opposite to arrow F, the extrusion head remaining stationary (portion 4E). The various slowdowns and preparations for stopping are ordered upon interception of detector 33. The encounter of the front edge of the glass sheet with detector 32 orders stopping of conveyor 2. After the end of laying of the bead, the latter is cut by the bead-cutter, and, to guarantee separation, the conveyor makes a short movement in the direction opposite arrow F.

Then the glass sheet is removed in the direction of arrow F. As can be seen in the speed diagrams of FIG. 4 on the arrival of the glass sheet (4A) before laying of the bead, the rotating speed of pump 67 is zero ($V_p=0$), the movement speed of extrusion head 51 by movement along vertical slides 70, 71 is also zero ($V_t=0$), only the conveyor speed is positive ($V_c$=positive).

To perform the laying of the bead along the front vertical edge of the glass sheet, the program orders the rise in speed of the motor of pump 67 ($V_p$) of motor 72 ($V_t$) and the level of these speeds after starting ($V_p$=constant, $V_t$=positive constant).

At the end of laying the bead along the vertical side, the program also orders the decrease in these speeds $V_p$ and $V_t$ to a zero value $V_p=0$ and $V_t=0$. During pivoting of the extrusion head, all the speeds are zero. Then to lay the bead along the upper horizontal edge of the glass sheet, the program orders the acceleration of the rotation of the motor of the pump and of conveyor 2 to:

$V_p$=constant and $V_c$=positive constant

During this time $V_l$=0.

The speed diagrams are seen at 4C. Then at 4D, corresponding to laying of the bead along the back vertical side in the descending direction it can be seen that:

$V_c$=0 $V_l$=negative constant and $V_p$=constant.

Then, as above, during pivoting of the nozzle $V_c$=0 $V_p$=0 $V_l$=0.

Then during laying of the bead along the lower horizontal side of the glass sheet (4E) it can be read that:

$V_p$=constant $V_l$=0 $V_c$=negative constant.

This represents an example of laying of a bead along the edges of a rectangular glass sheet. In the case of a sheet of any shape, for example, with oblique sides, we would have to move the glass sheet and the extrusion head simultaneously, therefore we would have has simultaneously:

$V_l$ and $V_c$ different from zero.

Thus, thanks to the simultaneous control of motor 72 which orders the translation of the head in a vertical or approximately vertical direction, of the motor of conveyor 2, of the motor of positive displacement pump 67 by a program, the accelerations and decelerations and the stabilized speeds of the these motors are determined with precision.

Thus, the constancy of the dimensions of bead 101 can be obtained.

Large sheets can be produced, with reduced handling operation which are limited to translations of said sheets.

The reduction of handling operations limits the bulk, on the one hand, and allows excellent qualities of the produced sheets, on the other hand.

The movements of the extrusion head are also limited to translations that allow relatively short lengths of the plastic distribution circuit. Thanks to the means provided for preparation of the plastic, high deliveries at the output of nozzle 52 are possible, even with a plastic of the butyl rubber/polyisobutylene mixture type, a mixture whose viscosity, hardness and, in general, extrusion difficulties are well known by those skilled in the art.

The installation according to the invention in which the glass sheets and nozzle are driven in relatively cross movements is particularly effective in the case where the glass sheets are placed vertically or approximately vertically, because of the small bulk and reduced number of handling operations.

However, such cross movements can also be advantageous in the case where the glass sheets have another arrangement, for example, in the case where they are flat.

Obviously, numerous modifications and variations of the present invention are possible in light of the aboe teachings. It is therefore to be understood that within the scope of the appended claims, the invention may be practiced otherwise than as specifically described herein.

What is claimed as new and desired to be secured by Letters Patent of the United States is:

1. An apparatus for applying a butyl rubber base plastic bead onto a face of a glass sheet, comprising:
    a panel having a substantially vertical surface for supporting a glass sheet;
    first conveyor means for linearly moving said glass sheet supported by said panel in two senses of a first direction;
    extrusion means having an extrusion nozzle positionable adjacent said face of said glass sheet supported by said panel; and
    means for linearly moving said nozzle in a second direction parallel to said face of said glass sheet supported by said panel.

2. The apparatus of claim 1 wherein said first and second directions are orthongal.

3. The apparatus of claim 2 including means for forming a gas cushion between said panel surface and said glass sheet.

4. The apparatus of claim 3 wherein said means for forming a gas cushion comprise air blowing orifices in said panel surface, said orifices which are at a level of a human head being directed non-horizontally.

5. The apparatus of claim 3 including a row of rollers extending in said second direction, each of said rollers projecting from said panel surface by a distance equal to a thickness of said cushion, rollers of said row being aligned with said nozzle for all positions of said nozzle in said second direction.

6. The apparatus of claim 2 wherein said first direction is horizontal, including second conveyor means at a bottom of said panel surface for moving said glass sheet in said first direction, said second conveyor means comprising:
    first and second vertically spaced endless belts formed of a high friction material, said belts extending in said first direction and positioned on one side of said panel surface;
    means for driving said belts; and
    means for defining a plurality of low pressure chambers between and behind said endless belts.

7. The apparatus of claim 6 wherein said means for defining a plurality of low pressure chambers comprise:
    a duct between and behind said encless belts; transverse bars between said endless belts for separating said duct into said chambers;
    vacuum forming means; and
    means including suction orifices in each of hambers for connecting said chambers with said vacuum forming means.

8. The apparatus of claim 7 wherein said second direction is vertical, wherein said extrusion means comprises:
    a plate to which said nozzle is fixed;
    two slides extending substantially vertically and parallel to said panel surface, said plate including means for permitting sliding of said plate along said slides;
    an endless screw threadedly engaged with said plate for moving said plate along said slides upon the rotation of said screw; and
    means for rotating said screw.

9. The apparatus of claim 8 wherein said extrusion means further comprise:
    a source of said plate; and
    means including a motor driven positive displacement pump for delivering said plastic from said 10. The apparatus of claim 9 including programmed control means for independently controlling said first and second conveyors, said vacuum forming means, said means for rotating said screw, and said motor driven positive displacement pump.

11. The apparatus of claim 10 wherein said control means includes means for detecting positions of said glass sheet and said nozzle.

12. The apparatus of claim 2 wherein said second direction is vertical, wherein said extrusion means
   a plate to which said nozzle is fixed;
   two slides extending substantially vertically and parallel to said panel surface, said plate including means for permitting sliding of said plate along said slides;
   an endless screw threadedly engaged with said plate for moving said plate along said slides upon the rotation of said screw; and
   means for rotating said screw.

13. The apparatus of claim 12 wherein said extrusion means further comprise:
   a source of plastic; and
   means including a motor driven positive displacement pump for delivering said plastic from said source to said nozzle.

14. The apparatus of claim 2 including means for moving said nozzle in a third direction normal to said panel surface.

15. The apparatus of claim 2 wherein an end of said nozzle forms an angle with said panel surface of between 15° and 45°, including means for rotating said nozzle about an axis normal to said panel surface.

16. The apparatus of claim 1 wherein said panel surface is inclined with respect to a vertical plane, whereby said glass sheet supported thereon is stable.

17. The apparatus of claim 1 including means for supporting a non-vertical said bead.

18. The apparatus of claim 17 wherein said means for supporting comprise at least one wheel having a hyperbolic concave axial surface positionable beneath said bead.

19. An apparatus for conveying a substantially vertically oriented glass sheet before a plastic extrusion nozzle, said apparatus comprising:
   two parallel and vertically spaced endless belts driven in the same direction and speed;
   a duct behind and between said belts;
   transverse bars separating said duct into an array of chambers spaced in said direction;
   means for forming a vaccum; and
   means including suction orifices in each said chamber for supplying said vacuum to said chamber.

20. The apparatus of claim 19 including means for applying a stronger vacuum to said chambers at ends of said array than to chambers at a central portion of said array.

* * * * *